(12) United States Patent
Wang

(10) Patent No.: US 6,563,506 B1
(45) Date of Patent: May 13, 2003

(54) METHOD AND APPARATUS FOR MEMORY BANDWITH ALLOCATION AND CONTROL IN A VIDEO GRAPHICS SYSTEM

(75) Inventor: Chun Wang, Toronto (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/211,220

(22) Filed: Dec. 14, 1998

(51) Int. Cl.[7] .......................... G06F 13/18; G06F 13/14
(52) U.S. Cl. ........................ 345/535; 345/531; 345/503; 345/519
(58) Field of Search ................................. 345/501–503, 345/519, 520, 531, 535, 541

(56) References Cited

U.S. PATENT DOCUMENTS

| | | | | |
|---|---|---|---|---|
| 5,754,801 A | * | 5/1998 | Lambrecht et al. ......... | 710/128 |
| 5,794,063 A | * | 8/1998 | Favor .......................... | 712/23 |
| 5,801,785 A | * | 9/1998 | Crump et al. ............... | 348/563 |
| 5,818,512 A | * | 10/1998 | Fuller ........................... | 348/8 |
| 5,877,741 A | * | 3/1999 | Chee et al. ................. | 345/113 |
| 5,907,688 A | * | 5/1999 | Hauck et al. ............... | 710/107 |
| 5,982,360 A | * | 11/1999 | Wu et al. .................... | 345/202 |
| 6,006,303 A | * | 12/1999 | Barnaby et al. ........... | 710/244 |
| 6,037,981 A | * | 3/2000 | Wilson et al. .............. | 348/384 |
| 6,104,417 A | * | 8/2000 | Nielsen et al. ............. | 345/521 |

\* cited by examiner

Primary Examiner—Ulka J. Chauhan
(74) Attorney, Agent, or Firm—Vedder, Price, Kaufman and Kammholz (57) ABSTRACT

A method and apparatus for allocation and control of memory bandwidth within a video graphics system is accomplished by first determining the memory bandwidth needs of each of the plurality of memory clients in the video graphics system. Based on this determination, a plurality of timers are configured, wherein each of the timers corresponds to one of the plurality of memory clients. The timers associated with the memory clients store two values. One value indicates the memory access interval for the corresponding client, which determines the spacing between memory access requests that can be issued by that particular client. The other value stored in the time is a memory access limit value, which determines the maximum length of a protected access to the memory by that particular client. A memory controller in the system receives requests from the plurality of clients and determines the priority of the different requests. The memory controller grants the requests with the highest priority, which may result in the termination of a current memory access. However, if the current memory access has equal or greater priority than a received access, the current memory access will not be terminated until the time associated with its memory access limit has expired.

20 Claims, 4 Drawing Sheets

METHOD AND APPARATUS FOR MEMORY BANDWITH ALLOCATION AND CONTROL IN A VIDEO GRAPHICS SYSTEM

FIELD OF THE INVENTION

The invention relates generally to video graphics processing and more particularly to a method and apparatus for memory bandwidth allocation and control in a video graphics system.

BACKGROUND OF THE INVENTION

Video information and graphical information are being combined in an increasing number of applications. Examples include video displays with animated graphical icons, on-screen menus, and a pop-up world-wide web browser. In these applications, the processing circuitry that prepares the video and graphical images for display must accommodate the requirements of both the video information and the graphical information. Because both of these types of information can consume large amounts of system bandwidth, speed limitations within the system can corrupt the video and/or graphical information during processing, thus resulting in errors when it is displayed.

In a system that displays video information and graphical information, and bother types of information are stored in the same memory structure, bandwidth limitations of the memory can cause bottlenecks which lead to corruption of the eventual output data stream provided to a display. In typical mixed video and graphics systems, video information is the first priority, as corruption within the video data stream is more noticeable and difficult to correct. In order to allow the video information and the graphical information within the system to be processed effectively and quickly such that corruption does not result, efficient use of existing bandwidth is essential.

For example, in a system that includes an MPEG video stream that requires a great deal of fetching from and storing to the memory in order to generate successive images, the amount of bandwidth consumed by these processing activities can be substantial. Combining this processing intensive bandwidth with the bandwidth required for the storage of an incoming video data stream, storage of incoming graphics images, and the fetching of these various images for display places demands on the memory that make efficient use of the limited memory bandwidth critical. In systems that display video information in real time, overloading memory bandwidth can starve one or more blocks in the system of the data it requires, thus causing images to be lost or corrupted on the display.

In prior art systems, these bandwidth considerations were not paramount, as video information and graphical information were often sourced separately and combined in a different manner that was less intertwined. In such cases, bandwidth limitations of a memory would typically effect only one of the two data sources. However, in systems which attempt to more fully integrate the video and graphics information storage and processing, these bandwidth limitations are magnified as both sets of data are handled by the same processing system, often utilizing a common memory structure.

Although one solution to the bandwidth problem might include expanding the bandwidth of the memory either by adding additional individual memory blocks or increasing the number of access ports or processors dealing with the memory, these solutions increase costs. These costs are incurred both in additional die area on the integrated circuit, and also in the additional complexity added to the system. As video graphics circuits continue to evolve, integration of the video processing and graphics processing portions of the system are important for both economic and functional reasons. For this reason, expanding the bandwidth of the memory through the addition of more memory or additional ports is undesirable.

Even when sufficient memory bandwidth is available to satisfy the needs of all of the clients within the system, starvation of one or more clients can still result if one of the other clients ties up the memory for too great of a time period. If one memory client is allowed to utilize the memory for an extended period of time, additional bandwidth will have to be provided for the memory to ensure that other clients in the system are able to perform their accesses in a timely manner. This additional bandwidth adds cost to the system and is therefore undesirable.

Therefore a need exists for a method and apparatus for allocating the available memory bandwidth in a video graphics system in such a way that the needs of all memory clients in the system are adequately met.

DETAILED DESCRIPTION OF A PREFERRED EMBODIMENT OF THE INVENTION

Generally, the present invention provides a method and apparatus for allocation and control of memory bandwidth within a video graphics system. This is accomplished by determining the memory bandwidth needs of each of the plurality of memory clients in the video graphics system. Based on this determination, a plurality of timers are configured, wherein each of the timers corresponds to one of the plurality of memory clients. The timers associated with the memory clients store two values. One value indicates the memory access interval for the corresponding client, which determines the spacing between memory access requests that can be issued by that particular client. The other value stored in the timer is a memory access limit value, which determines the maximum length of a protected access to the memory by that particular client. A memory controller in the system receives requests from the plurality of clients and determines the priority of the different requests. The memory controller grants the requests with the highest priority, which may result in the termination of a current memory access. However, if the current memory access will not terminate until the time associated with its memory access limit has expired. By understanding the bandwidth requirements of each of the clients and controlling the accesses to the memory by the clients such that the accesses are regular and interspersed throughout time, the available bandwidth of the memory is shared between the clients in an efficient manner.

Figure 1:
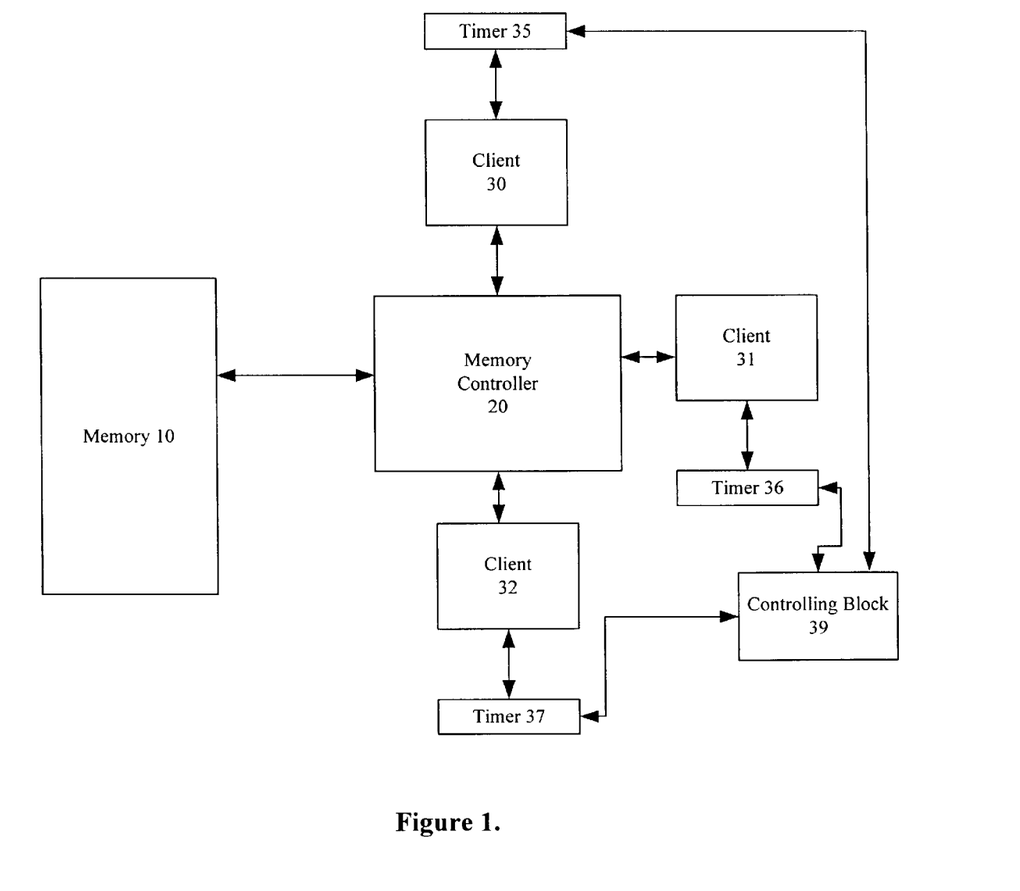
FIG. 1 illustrates a block diagram of a memory controlling system in accordance with the present invention.

The invention can be better understood with reference to FIGS. 1–4. FIG. 1 illustrates a system that includes a memory 10, a memory controller 20, a plurality of clients 30–32, and a plurality of timers 35–37. Each of the clients 30–32 has a corresponding timer 35–37. Each of the timers 35–37 stores for its particular client a corresponding memory access limit and a corresponding memory access interval. The memory access limit determines the maximum length of time that the client can access the memory 10 in a protected manner that ensures other clients of equal or lower priority cannot terminate the access by initiating an access. The memory access interval determines the length of time that the particular client must wait from the completion of one memory access until it is able to issue another memory access request.

Preferably, each of the clients 30–32 has an associated priority level that determines which clients have preference when accessing the memory. This priority level is preferably based on the bandwidth requirements of each of the clients. Thus clients having more tolerance, implying that the client can tolerate a longer wait between memory access, will have a lower priority than clients that cannot tolerate long intervals between memory accesses.

Similarly, the memory access limits and the memory access intervals for each of the plurality of clients 30–32 are preferably based on the data requirements for each client. Thus, clients that require a large amount of memory bandwidth will have larger memory access limits allowing them to access the memory for a longer amount of time, and possibly shorter memory access intervals, thus allowing more frequent accesses to the memory.

Clients that have high priority, high memory access limits, and low memory access intervals will receive the most amount of memory bandwidth, and at the time they need it. Clients that have more tolerance for long waits between memory accesses will have shorter memory access limits, longer memory access intervals, and most likely a lower priority. These higher tolerance clients typically obtain access to the memory in the gaps between the higher priority clients.

The memory controller 20 is operably coupled to the memory 10 and each of the plurality of clients 30–32. The memory controller 20 receives memory access requests from each of the clients and determines which of the memory access requests is to be granted and at what time. The memory controller 20 selectively grants the memory access requests based on the priority level of the requesting client and whether or not a current memory access is in progress.

The system illustrated in FIG. 1 may also include a controlling block 39 that is operably coupled to each of the timers 35–37. If the parameters within the system change such that the priority level, the memory access limit, or the memory access interval of one or more of the plurality of clients 30–32 needs to be changed, the controller 39 may reconfigure at least one of the timers 35–37 to reflect this need.

The system of FIG. 1 illustrates the general applicability of the technique for memory bandwidth allocation described herein. In other embodiments, clients may be included in the system that do not require a timer because they are of such low priority and such infrequent access that their access requests do not have to be controlled. Similarly, a client may exist that, although it requires a great deal of memory access, for some reason the accesses by that particular client are at regular and controlled intervals. An example of this is a client that receives a data stream and collects the data stream into blocks before storing the blocks in the memory 10.

By utilizing the timers 35–37, the memory accesses of the clients 30–32 can be controlled and spread out over the time period during which the memory 10 is accessed. This makes efficient use of the memory bandwidth that is available. By ensuring that one of the clients 30–32 does not retain the memory for too great of a time or request it too frequently, the bandwidth required by the other clients is more likely to be available when it is needed.

Figure 2:
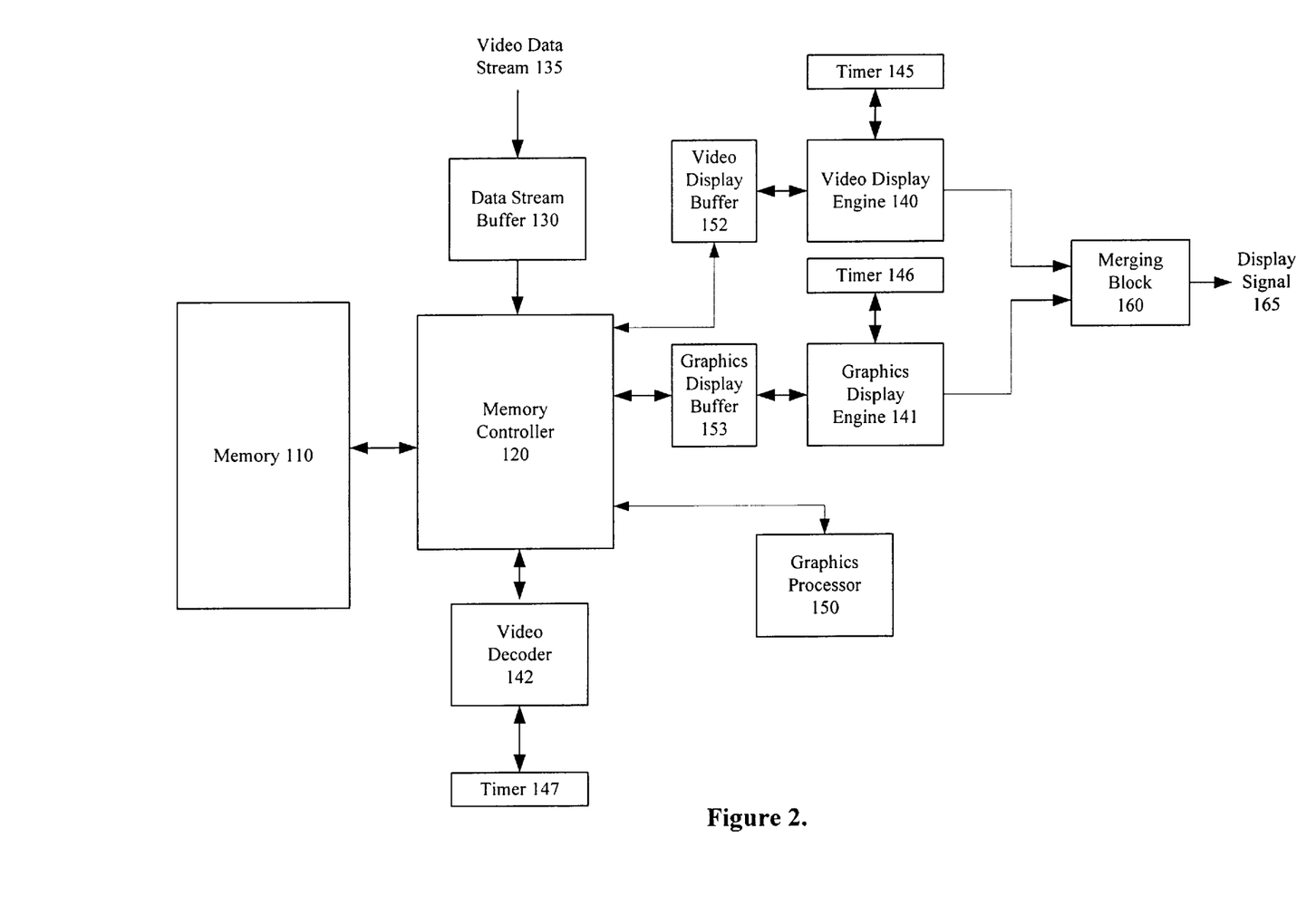
FIG. 2 illustrates a block diagram of a video graphics system in accordance with the present invention.

FIG. 2 illustrates a video graphics circuit that includes a memory 110, a memory controller 120, a plurality of clients, and a plurality of timers 145–147. The plurality of clients includes a video decoder 142, a video display engine 140, a graphics display engine 141, and a graphics processor 150. The plurality of timers 145–147 includes a corresponding timer for each of at least a portion of the plurality of memory clients. In other words, timers are included for at least some of the plurality of memory clients.

Figure 3:
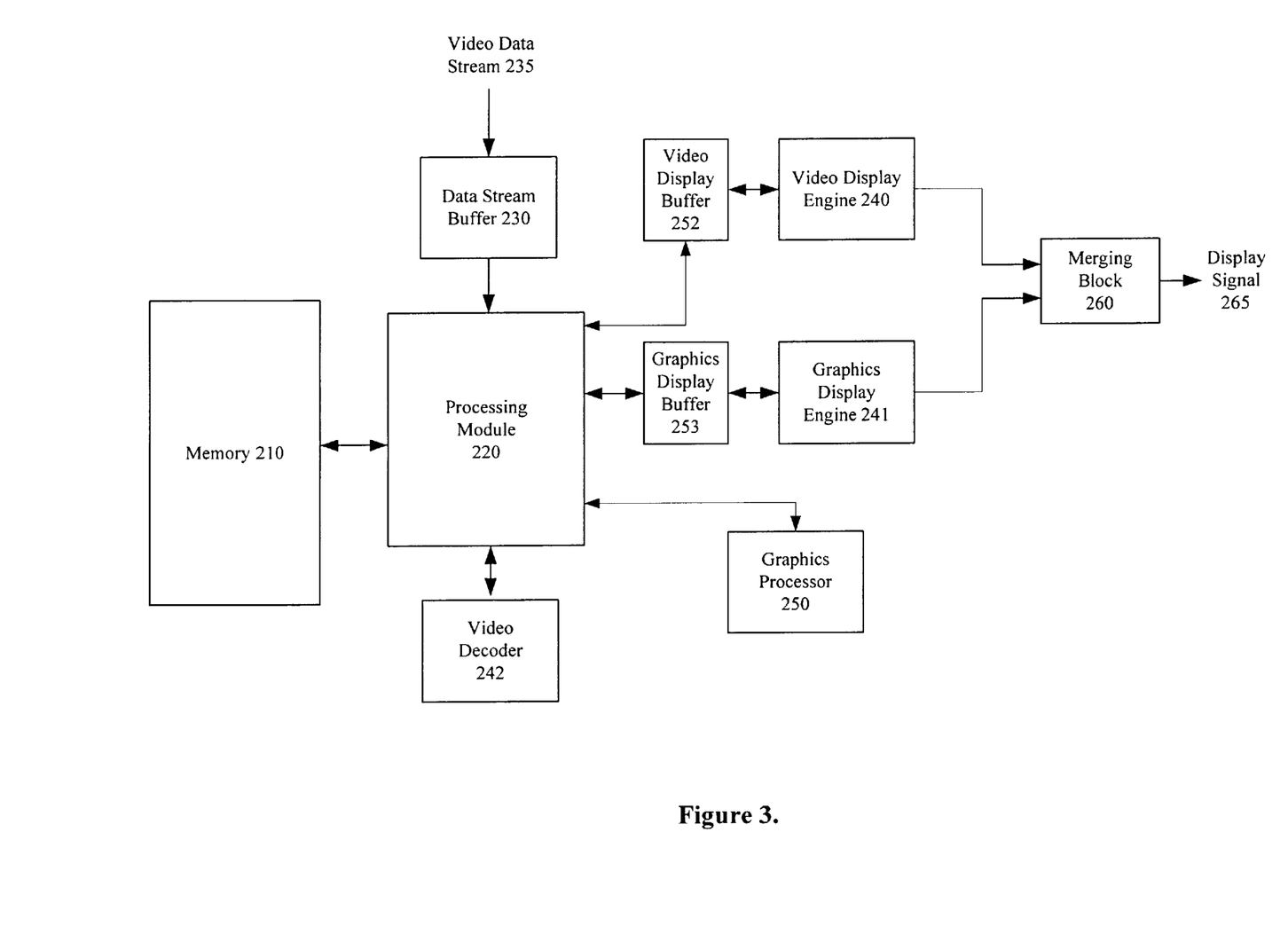
FIG. 3 illustrates a block diagram of an alternate video graphics system in accordance with the present invention.

In one embodiment, the video graphic circuit illustrated in FIG. 3 may be utilized in a high definition television (HDTV) system. In such a system, the memory clients within the video graphics system all share the memory 110. The memory 110 stores both video and graphics data. In an HDTV system, the video information is of paramount importance. This is because if video frames are lost or corrupted, the effects will be very detrimental to the display. For this reason, the video elements of the system must be provided with the bandwidth that they need in order to function at the correct rate and without error.

The memory controller 120 receives a video data stream 135, which includes video data for processing and display. The video data stream 135 is preferably buffered by a data stream buffer 130, which may be a first-in-first-out buffer (FIFO). Preferably, the data stream buffer 130 stores data received from the video data stream 135 until a threshold level is reached. When the threshold is reached, the data stream buffer 130 requests that the memory controller 120 provide access to the memory 110 such that the data that has been accumulated in the data stream buffer 130 may be transferred into the memory 110. Thus, the data from the video data stream 135 will be received in regular intervals, as data in the video data stream arrives at a fixed rate. For this reason, no timer is required for the video data stream 135 to control the frequency or the length of the accesses to the memory 110 that will be requested for the purpose of storing the video data stream 135 in the memory 110.

The memory controller 120 is also coupled to each or the plurality of clients. Each client within the plurality of clients will issue memory access requests to the memory controller 120. Preferably, each of the plurality of clients has a priority level associated with it that determines the preference level of that particular client to access the memory. The memory controller receives the requests from the plurality of clients and determines which of the clients is allowed access to the memory 110 at each particular time.

The plurality of clients includes the video decoder 142, which is coupled to a timer 147. The video decoder 142 decodes video frames, which is typically performed on a continuing basis in order to support a video display such as an HDTV display. Preferably, the video information processed by the video decoder 142 in video data in an MPEG format. In the MPEH format, successive video images are often generated based on previously generated video images. In order to accomplish this, the video decoder 142 must retrieve the previously generated image from the memory 110 and combine it with newly received data to generate a new image. The new image must then be stored in the memory 110 such that it can be retrieved for display. Thus, processing of MPEG image data requires the video decoder 142 to frequently access the memory 110 both to store and to retrieve image data.

The video decoder 142 must keep up with the receipt of video data from the video data stream 135 in order to ensure that frames are not dropped. As mentioned earlier, dropped frames result in a corrupted display. Because the video display is of paramount importance in a video graphics system that generates a display such as a television display, the priority level of the video decoder 142 will be relatively high. Similarly, the volume of data that the video decoder 142 must store in and retrieve from the memory 110 is relatively large because of the amount of video information processed and displayed. For this reason, the timer 147 will store a large memory access limit parameter for the video decoder 142. As before, the memory access limit parameter determines the maximum length of a protected access by the video decoder 142. A protected access cannot be interrupted by another client that has a priority level that is the same or lower than the priority level of the client performing the protected access. However, if another client has a higher priority level, a protected access may be interrupted.

The memory access interval parameter for the video decoder 142 is likely to be reasonably small, thus ensuring that the video decoder 142 can make frequent requests to the memory controller 120. If the memory access interval is set to a larger value, there will be long delays between the completion of one memory access and the issuance of a request for an additional memory access. Because the video information in many systems is critical, the memory access interval corresponding to the video decoder 142 is likely to be relatively short to allow the video decoder 142 to receive the frequent memory access that it requires in a timely fashion.

The graphics processor 150 generates graphics images that are stored in the memory 110 for display. In a system such as an HDTV display system, the graphics processor 150 is of much lower priority than the video decoder 142. In the system illustrated in FIG. 3, the graphics processor 150 is of such low priority that it does not even require a corresponding timer. Because low priority accesses to the memory 110 can be interrupted by any other memory client having a higher priority, there is no need to limit the frequency of accesses by the graphics processor 150. As such, the graphics processor 150 can request a memory access at any point in time. Because it is of a lower priority level, it is unlikely that it will receive the access to the memory unless no other client is requesting access. The graphics processor 150 has a great amount of tolerance in terms of not receiving memory access time when it requests it. This is because the information stored in the memory by 110 by the graphics processor 150 is not nearly as critical as video information in the system. Graphics information displayed to a display does not typically have frame rate requirements that exist with respect to video information. Small delays in the display of static graphical icons or menus will not have the detrimental effects on the system that delays in the display of video information may produce.

The video display engine 140 and the graphics display engine 141 retrieve video and graphics data from the memory 110 and produce display signals that are preferably combined by the merging block 160 to create a display signal 165. If either the video display engine 140 or the graphics display engine 141 is denied access to the memory 110 for an extended length of time, the display engines will be unable to produce the resulting display signal 165 at the required rate, thus corrupting the display. For this reason, the display engines 140 and 141 are equipped with timers 145 and 146. As before, the timers 145 and 146 store memory access limits and memory access intervals for the two display engines 140 and 141. The timers 145 and 146 may store these parameters in registers. Because the display engines 140 and 141 most produce the display signal 165 at a predetermined rate, they are likely to have a higher priority then that of the graphics processor 150.

The display signal 165 is generated to create a display on a display device. Typically in most display devices, there is a horizontal blank time that is associated with the return of the scanning device that creates the display from one side of the screen to the other. During this time, the display signal 165 is ignored by the display device. Ideally, this horizontal blank time could be taken advantage of by other portions of the video graphics system in order to ensure adequate memory bandwidth for those other portions of the system. However, because the video data stream 135 is received at a fixed rate, and the video decoder 142 must decode and process the video data stream 135 at a corresponding rate, it is difficult for the system to take advantage of this horizontal blank time.

Because the data requirements by the video display engine 140 and the graphics display engine 141 are based on the needs of the display, there will be times when the display engine 140 and 141 will not be requesting memory accesses. This time corresponds to the horizontal blank time. In order to spread out the bandwidth requirements of the video and graphics display engines 140 and 141, the system may be equipped with video display buffer 152 and graphics display buffer 153. Including these buffers in the system allows the memory requirements of the video and graphics display engines 140 and 141 to be more uniform, as data retrieved from the memory 110 during the horizontal blank time can be buffered in the buffers 152 and 153 until it is required by the video and graphics display engines 140 and 141. Without the buffers 152 and 153, the video and graphics display engines 140 and 141 request access to the memory 110 during all times except during the horizontal blank. The video and graphics display buffers 152 and 153 provide a storage location such that the video and graphics display engines 140 and 141 can request access to the memory 110 at a more constant rate, thus ensuring that other portions of the system will not be overwhelmed by the bandwidth demand placed on the memory during the time outside the horizontal blank.

By including timers in the video graphics system that determine the length of memory accesses, and spacing between such memory accesses, the bandwidth available in the system can be spread amongst the memory clients in such a way that ensures each memory client will receive the bandwidth it requires. Priority levels assigned to each of the clients within the system further ensure that priority clients that are important to the system receive memory access when required. Thus, the parameters within each of the timers 145–147 are based on the bandwidth requirements of each of their corresponding clients 140–142. Other clients, such as the graphics processor 150, have such low priority that no timer is required to control their access to the memory 110. This is because these low priority clients can be overpowered by higher priority clients at any time. Similarly, received data streams, such as the video data stream 135, are presented at a fairly constant rate that ensures their level of memory access requests will be within the tolerance of the bandwidth limitations of the system. For this reason, accesses by these data streams to the memory 110 are also not regulated by a timer. These data streams are effectively self-regulating.

FIG. 3 illustrates an integrated circuit that includes a memory 210, a processing module 220, and a plurality of clients. Preferably, the plurality of clients includes a video decoder 242, a video display engine 240, a graphics display engine 241, and a graphics processor 250. The processing module 220 is also preferably coupled to receive a video data stream 235 which may be buffered by a data stream buffer 230. The data stream buffer receives the video data stream 235 and stores portions of the video data stream 235 until a threshold level is reached at which point it will request that the processing module allow the buffer access to the memory 210 such that it can store the portion of video data that it has accumulated.

The memory stores a set of operational instructions that when read and executed by the processing module cause the processing module to determine a plurality of access parameters corresponding to the plurality of clients. For each client in the plurality of clients, the processing module 220 will determine a corresponding memory access limit parameter and a corresponding memory access interval parameter. These parameters are as was described with respect to FIGS. 1 and 2 in that they limit the frequency of memory accesses by the client and also limit the maximum length of a protected access by the client. The processing module 220 also determines a priority for each of the plurality of clients, where the priority determines memory accessing priority for each of the clients such that clients having higher priority can cause an access by a lower priority client to be terminated.

The processing module 220 receives memory access requests from each of the plurality of clients, and when the processing module 220 receives a particular request, it first determines if the memory is engaged in a current memory access. When the memory is not engaged in an access, the processing module will grant the memory access request. However, when the memory is engaged in a current access, the priority of the newly requesting client will be compared to the priority of the client that is engaged in the current memory access.

When the priority of the requesting client is greater than the priority of the client that is engaged in the current access, the processing module 220 will terminate the current memory access and grant the memory access request from the requesting client. If it determined by the processing module 220 that the priority of the requesting client is lower, or less than, the priority of the client engaged in the current memory access, the processing module will first determine if the current memory access has exceeded the memory access limit parameter corresponding to the client engaged in the current access. If the current memory access has exceeded the memory access limit, the current memory access is no longer protected and will be terminated. Once the current access has been terminated, the processing module 220 is free to grant the memory access request from the requesting client.

If the processing module 220 determines that the priority of the requesting client is less than the priority of the client engaged in the current access and the current memory access has not exceeded the memory access limit corresponding to that client, the memory access requests from a requesting client will be queued. Queued memory accesses are dealt with once the current memory access has terminated or exceeded its memory access limit.

Is The integrated circuit of FIG. 3 preferably includes video display and graphics display buffers 252 and 253. These buffers serve the same function as the two buffers 152 and 153 illustrated in FIG. 2. Similarly, the integrated circuit of FIG. 3 preferably includes merging block 260, which merges the outputs of the two display engines 240 and 241 to produce the output display signal 265, which is similar to the function performed by the merging block 160 of FIG. 3.

The processing module 220 of FIG. 3 is also preferably configured such that it is able to detect a change in display configuration and is able to update the plurality of access parameters based on the new display configuration. If the display is changed such that the requirements of the video processing circuitry within the system increase, the parameters corresponding to those video processing elements will be altered such that they are ensured adequate bandwidth to meet these additional processing needs. The system illustrated in FIG. 3 is similar to the system illustrated in FIG. 2, however the function of the timers associated with FIG. 2 is included in the processing module 220. The processing module may simply gate memory access requests received from the plurality of clients such that the clients do not need to determine when they are able to issue memory requests, but rather issue them at will. The processing module 220 acts as a memory controller in that it can choose to grant or deny memory access requests based both on priority and the timing parameters corresponding to each of the plurality of clients.

Figure 4:
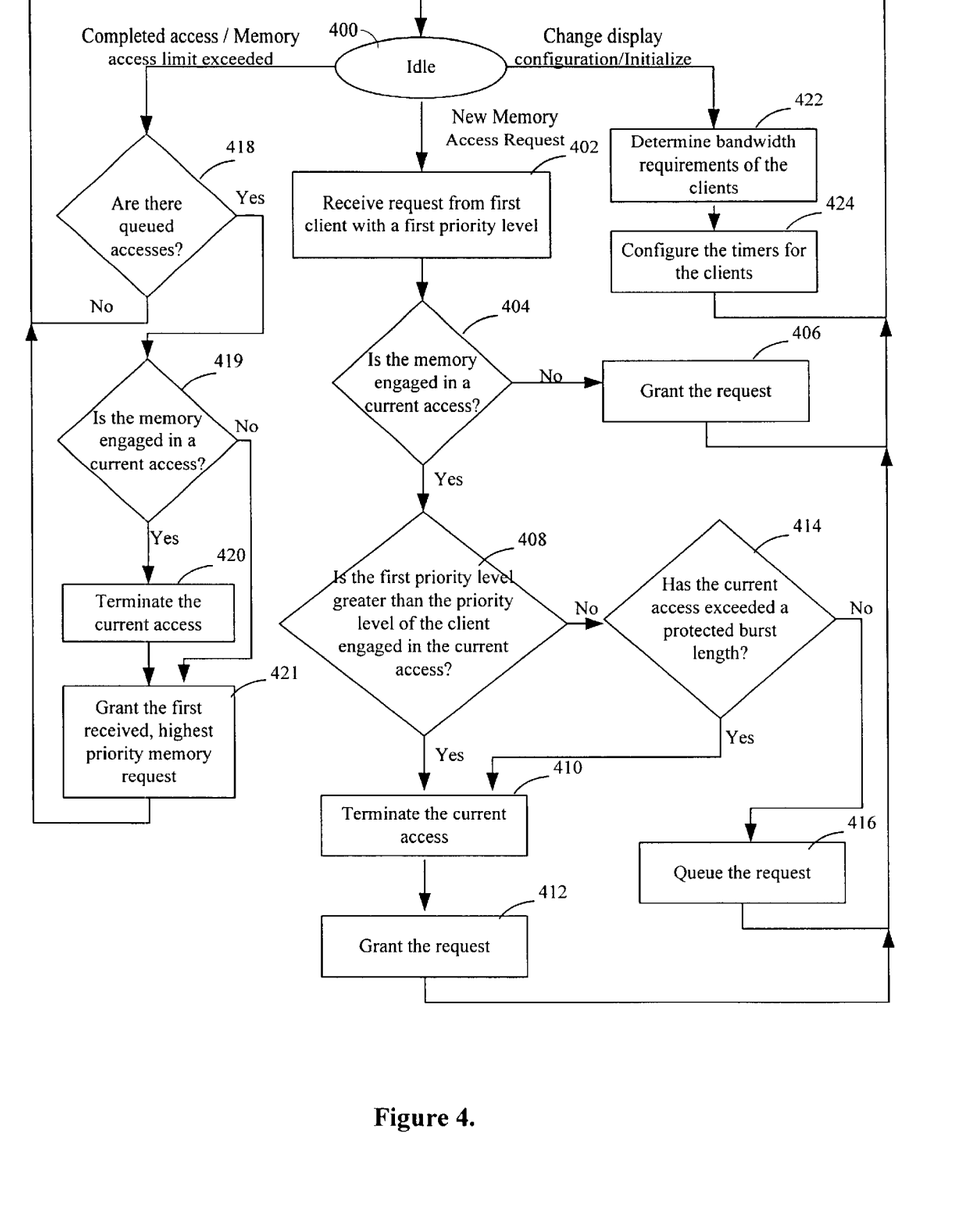
FIG. 4 illustrates a flow chart of a method for arbitrating accesses to a memory in accordance with the present invention.

FIG. 4 illustrates a flow diagram of a method for arbitrating access to a memory. The home state, or beginning step, for the flow chart is step 400, at which an idle state is determined. The idle state waits for a change in the current situation before proceeding to other steps within the flow diagram. On initialization, the method moves to step 422, where the bandwidth requirements for each of a plurality of clients that access a shared memory is determined. Bandwidth priority may be granted to real-time clients, such as a real-time video client. Clients with this type of bandwidth priority, which give them higher priority with respect to other clients, will be able to gain access to the memory more readily when they require it. At step 424, a plurality of timers are configured, where each timer corresponds to one of the plurality of clients. Some clients may not require a timer, as their memory usage may be constant or of very low priority. These types of clients were described in more detail with respect to FIGS. 2 and 3. Steps 422 and 424 will also be executed when a display configuration change is detected, thus requiring the timers for the clients to be altered to reflect the demands placed on the clients by the new display configuration. The timers for each of the clients include a memory access time and a memory access interval. As described earlier, the memory access limit determines the maximum protected time for which that particular client can access the memory, and the memory access interval determines the time spacing between memory accesses for the particular client.

Once the timers have been configured, the flow diagram returns to the idle state. At the idle state, if the system receives a new memory access request, it proceeds to step 402. At step 402 the request is received from a first client having a first priority level. At step 404, it is determined whether or not the memory is engaged in a current memory access. If the memory is not engaged in a current memory access the method proceeds to step 406, where the request from the first client is granted. The system then returns to the idle state 400.

If it is determined at step 404 that the memory is engaged in a current access, the method proceeds to step 408. At step 408, it is determined whether the first priority level corresponding to the first client is greater than the priority level of the client that is engaged in the current memory access. If the first priority level is not greater than the priority level of the client engaged in the current access, the method proceeds to step 414, where it is determined whether the current memory access has exceeded its protected burst length. The protected burst length is determined by the memory access limit parameter for that particular client. Note that if some clients do not have memory access limits, they are likely to have very low priority levels, such that step 414 will not be reached from step 408. If the current memory access has not exceeded its protected burst length, the method proceeds to step 416 where the request is queued and the system then returns to the idle state.

If it is determined at step 414 that the current access has in fact exceeded its protected burst length, the method proceeds to step 410. Similarly, step 410 will be reached if it is determined at step 408 that the first priority level of the client making the memory access request is greater than the priority level of the client that is engaged in the current access. At step 410, the current memory access is terminated, thus allowing the request for memory access from the first client to be granted at step 412. The system then returns to the idle state.

While in the idle state, if it is determined that an access has been completed or that the memory access limit, or burst length, of a particular client has been exceeded, the method proceeds to step 418 where it is determined whether or not there are queued accesses. If there are no queued accesses, the system returns to the idle state. If there are queued accesses, the system proceeds to step 419 where it is determined whether or not the memory is engaged in a current access. If the memory is engaged in a current access, the method proceeds to step 420 where the current access is terminated. The method then proceeds to step 421. Similarly, if the memory is determined to not be engaged in a current access at step 419, the method proceeds to step 421.

At step 421, the first-received highest priority memory request that is in the queue is granted. Thus, accesses that have been queued are sorted based on both priority and time of receipt to determine which memory access from the queue will be granted next. Once the next memory access has been granted, the system returns to the idle state.

The method illustrated in FIG. 4 allows a memory system to divide up available bandwidth amongst a plurality of clients such that each of the clients within the plurality is able to achieve the level of memory access that it requires. In a video graphics system that supports a real-time video display, video clients will typically require the highest priority, thus allowing the video clients to process the video data rapidly enough to support the real-time video display. In such systems, graphics clients, which may produce menus and graphics icons for display, are typically not concerned with real time display of the data that they produce. For this reason, the memory accesses of these graphics clients can be interspersed amongst the higher priority video clients.

It should be understood that the implementation of other variations and modifications of the invention and its various aspects will be apparent to those of ordinary skill in the art, and that the invention is not limited to the specific embodiments described. For example, a single timer may be used to control the memory accesses of more than one memory client within the system. It is therefore contemplated to cover by the present invention, any and all modifications, variations, or equivalents that fall within the spirit and scope of the basic underlying principles disclosed and claimed herein.

What is claimed is:

1. An integrated circuit comprising:
   a plurality of clients;
   a plurality of timers, wherein each of the plurality of timers corresponds to one of the plurality of clients; wherein, for each of client of the plurality of clients, a corresponding timer determines a memory access limit and a memory access interval, wherein the memory access interval determines the minimum length of an interval between memory accesses for the corresponding client and wherein the memory access limit determines the maximum protected length of a memory access for the corresponding client, wherein the maximum protected length is a duration during which the memory access cannot be interrupted by another access of similar or lower priority and during which the memory access of a client is capable of being interrupted by another access of a higher priority client;
   a memory;
   a memory controller operably coupled to the memory and the plurality of clients, wherein the memory controller receives memory access request from the plurality of clients, and wherein the memory controller selectively grants the memory access request.

2. The integrated circuit of claim 1, wherein each client of the plurality of clients has a priority level, and wherein the memory controller terminates a memory access of a lower priority level client when a request is made by a higher priority level client.

3. The integrated circuit of claim 2, wherein the memory access limit and the memory access interval of each of the clients is based on data requirements for each client.

4. The integrated circuit of claim 3, further comprises a controlling block, wherein the controlling block modifies the memory access limit and memory access interval of each of the plurality of timers.

5. A video graphics circuit comprising:
   a memory, wherein the memory stores video frames, video data, and graphics data;
   a plurality of clients including:
      a video decoder;
      a video display engine
      a graphics display engine; and
      a graphics processor;
   a plurality of timers operably coupled tot he plurality of clients, wherein for each client of at least a portion of the plurality of clients, a corresponding timer determines a memory access limit and a memory access interval, wherein the memory access interval determines the minimum length of the an interval between memory accesses for the corresponding client and wherein the memory access limit determines the maximum protected length of a memory access for the corresponding client, wherein the maximum protected length is a duration during which the memory access cannot be interrupted by another access of similar or lower priority and during which the memory access of a client is capable of being interrupted by another access of a higher priority client;
   a memory controller operably coupled to the plurality of clients and the memory, wherein the memory controller receives a video data stream, wherein the memory controller stores the video data stream in the memory as at least a portion of the video data, wherein the memory controller receives memory access request from the plurality of clients and selectively grants the memory access request.

6. The video graphics circuit of claim 5, wherein each client of the plurality of clients has a priority level, and wherein the memory controller terminates a memory access of a lower priority level client when a request is made by a higher priority level client.

7. The video graphics circuit of claim 6, wherein for each timer of the plurality of timers, the timer includes a first register that stores the memory access limit for a corresponding client.

8. The video graphics circuit of claim 7, wherein for each timer of the plurality of timers, the timer includes a second register that stores the memory access interval for the corresponding client.

9. The video graphics circuit of claim 5 further comprises at least one buffer operably coupled to at least one corresponding client of the plurality of clients and the memory controller, wherein the at least one buffer stores data for a memory access request for the corresponding client.

10. The video graphics circuit of claim 5 further comprises a buffer operably coupled to the memory controller, wherein the buffer receives the video data stream and buffers the video data stream such that receipt of the video data stream by the memory controller is in a burst format rather than a serial stream.

11. The video graphics circuit of claim 5, wherein the video decoder further comprises an MPEG video decoder.

12. The video graphics circuit of claim 5, wherein the video display engine includes circuitry for generating a video display signal for a high-definition television display.

13. The video graphics circuit of claim 5, wherein settings for the plurality of timers are based on memory bandwidth requirements of each of the plurality of clients.

14. A method for arbitrating access to a memory, comprising:
configuring a plurality of timers, wherein the plurality of timers correspond to a plurality of clients, wherein each timer of the plurality of timers determines a memory access limit and a memory access interval for a corresponding client;
receiving a memory access request from a first client of the plurality of clients, wherein the first client has a first priority;
determining if the memory is engaged in a current memory access;
when the memory is not engaged, granting the memory access request; and
when the memory is engaged, comparing the first priority to a second priority, wherein the second priority corresponds to a second client that is engaged in the current memory access;
when the first priority is greater than the second priority:
terminating the current memory access; and
granting the memory access request;
when the first priority is less than the second priority:
determining if the current memory access has exceeded a memory access limit of the second client;
when the current memory access has exceeded the memory access limit of the second client:
terminating the current memory access; and
granting the memory access request;
when the current memory access has not exceed the memory access limit of the second client, queuing the memory access request.

15. The method of claim 14, wherein configuring further comprises:
determining bandwidth requirements for the plurality of clients, wherein the plurality of memory clients includes a video decoder, a video display engine, a graphics display engine, and a graphics processor; and
configuring the plurality of timers based on the bandwidth requirements.

16. The method of claim 15, wherein determining bandwidth requirements further comprises granting bandwidth priority to real-time video clients.

17. An integrated circuit, comprising:
a plurality of clients;
a processing module; and
memory operably coupled to the processing module, wherein the memory includes operational instructions that cause the processing module to:
determine a plurality of access parameters, wherein the plurality of access parameters correspond to the plurality of clients, wherein for each client of the plurality of clients, there is a corresponding memory access limit parameter and a corresponding memory access interval parameter;
determine a priority for each of the plurality of clients;
when a memory access request is received from a first client of the plurality of clients having a first priority, determine if the memory is engaged in a current memory access;
when the memory is not engaged, grant the memory access request; and
when the memory is engaged, compare the first priority to a second priority, wherein the second priority corresponds to a second client that is engaged in the current memory access;
when the first priority is greater than the second priority:
terminate the current memory access; and
grant the memory access request;
when the first priority is less than the second priority:
determine if the current memory access has exceeded the memory access limit parameter of the second client;
when the current memory access has exceeded the memory access limit of the second client:
terminate the current memory access; and
grant the memory access request;
when the current memory access has not exceed the memory access limit of the second client, queue the memory access request.

18. The integrated circuit of claim 17, wherein the plurality of clients includes:
a video decoder;
a video display engine;
a graphics display engine; and
a graphics processor.

19. The integrated circuit of claim 18 further comprises a merging block operably coupled to the video display engine and the graphics display engine, wherein the merging block receives video display data from the video display engine, wherein the merging block receives graphics display data from the graphics display engine, and wherein the merging block merges the video display data and the graphics display data to produce a display signal for display on a display device having a display configuration.

20. The integrated circuit of claim 19, wherein the processing module further functions to:
detect a changed display configuration; and
update the plurality of access parameters based on the changed display configuration.

* * * * *